United States Patent [19]

Brewer et al.

[11] 4,133,783

[45] Jan. 9, 1979

[54] THERMOSETTING CELLULOSE ESTER POWDER COATING COMPOSITION

[75] Inventors: Richard J. Brewer; Peter M. Grant; Robert B. Taylor, all of Kingsport, Tenn.

[73] Assignee: Eastman Kodak Company, Rochester, N.Y.

[21] Appl. No.: 699,022

[22] Filed: Jun. 23, 1976

Related U.S. Application Data

[63] Continuation-in-part of Ser. No. 519,180, Oct. 30, 1974, abandoned.

[51] Int. Cl.$^2$ .................... C08B 3/18; C08B 3/22; C08L 1/14; C08J 3/12
[52] U.S. Cl. ..................... 260/15; 106/176; 106/181; 106/186; 106/187; 106/196; 427/195; 428/402; 536/31
[58] Field of Search ............... 106/176, 180, 181, 186, 106/187, 196; 260/15, 213, 225, 230; 427/195; 428/402

[56] References Cited

U.S. PATENT DOCUMENTS

| | | | |
|---|---|---|---|
| 3,491,037 | 1/1970 | Keys et al. | 260/15 |
| 3,862,062 | 1/1975 | Harper | 260/15 |
| 3,862,063 | 1/1975 | Petit, Jr. | 260/15 |
| 3,868,338 | 2/1975 | Parsons et al. | 260/15 |
| 4,007,144 | 2/1977 | Sanders et al. | 260/15 |

FOREIGN PATENT DOCUMENTS 898901  6/1962  United Kingdom .................... 427/195

*Primary Examiner*—Joan E. Welcome
*Attorney, Agent, or Firm*—Daniel B. Reece, III; John F. Stevens

[57] ABSTRACT

Thermosetting powder coating compositions comprising cellulose butyrate having a butyryl content of from about 35% to about 55% by weight, a hydroxyl content of from about 0.5% to about 3.0% by weight, and a viscosity of from about 0.05 to about 1.0 second are disclosed. The composition further comprises a crosslinking agent and a catalyst which allows the powder to flow out prior to fusion. Coatings formed by this composition have excellent physical properties and appearance.

8 Claims, No Drawings

THERMOSETTING CELLULOSE ESTER POWDER COATING COMPOSITION

This application is a continuation-in-the part of our application Ser. No. 519,180, filed Oct. 30, 1974, now abandoned.

This invention relates generally to thermosetting powder coating compositions, and more specifically to such compositions comprising cellulose acetate butyrate as the main film-forming component.

Plastic materials for powder coatings are classified broadly as either thermosetting or thermoplastic. In the use of thermoplastic powder coatings, heat is applied to the coating on the substrate, thereby melting the particles of thermoplastic powder. The molten particles flow together and form a smooth coating prior to removal of heat, which allows the coating to cool and solidify.

Thermoplastic coatings, however, have several disadvantages compared to thermosetting coatings. Thermosetting coatings generally are tougher, more resistant to solvents, have better adhesion to metal substrates, and do not tend to soften when exposed to elevated temperatures. Coatings are usually applied from organic solvent systems, which are not as desirable as powder coating systems because of the usual fire and health hazards, as well as cost. Thermosetting powder coatings are easier to grind and give thinner coatings with better heat resistance than thermoplastic coatings.

It has been found that when certain cellulose esters are mixed with conventional crosslinking agents such as aminoplasts, crosslinking will occur under curing conditions. Powder coatings made from compositions containing the modified cellulose acetate butyrate according to this invention are found to have excellent physical properties, such as good flow-out capability producing good appearance even in thin coatings of about 1.5 mils, good weatherability, resistance to heat, scuffing, moisture and solvent, hardness, flexibility and excellent impact strength.

It is, therefore, an object of the present invention to provide a noncaking thermosetting powder coating composition which is friable and free-flowing at ambient conditions.

It is another object of this invention to provide a thermosetting powder coating composition which will flow out prior to curing or thermosetting to result in a smooth, glossy coating substantially free of the so-called "orange-peel" appearance.

It is a further object of this invention to provide a thermosetting powder coating composition having good weatherability, good general physical characteristics, and excellent appearance which allows its use in applications where appearance is a major consideration.

Other objects of this invention will appear herein.

According to the present invention, an improved thermosetting cellulose acetate butyrate powder coating composition is provided. The cellulose acetate butyrate is described as having a butyryl content of from about 3.5 to about 55% by weight, a hydroxyl content of from about 0.5% to about 3% by weight, and a viscosity of from about 0.05 to about 1.0 second. Up to about 15% acetyl content by weight is permissible. Such cellulose esters are commercially available from Eastman Chemical Products, Inc., under the trade designation EAB 551-0.2 and EAB 381-0.5. It has been found that, when the hydroxyl content of the cellulose ester is increased above about 3.0% by weight, the coating made therefrom loses considerably in impact strength, flexibility, and flow characteristics, because of excessive crosslinking. Furthermore, it has been found that when the viscosity is increased above about 1.0 second, the melt viscosity is such that a resulting coating has sufficient orange peel to be undesirable in many applications. Higher viscosities can be tolerated using lower hydroxyl contents within the stated limits which retard rate of cure. For the best balance of properties, it is preferred that when the hydroxyl content is in the higher part of this range, the viscosity is in the lower part of the stated range, and vice versa. Low viscosities within the range of from about 0.1 to about 0.3 second and hydroxyl contents of about 2% by weight are found to be most desirable.

Although coatings having properties acceptable for some applications may be made from cellulose esters having a broader range of hydroxyl content and viscosity, the cellulose butyrate coatings of the present invention have exceptional appearance quality which makes the coating especially desirable for applications where appearance is a major consideration, such as on automobiles.

The film-forming constituents of the powder coating compositions according to this invention consist essentially of the cellulose ester described above, a plasticizer for such cellulose ester, a crosslinking agent and a catalyst. Optionally, the composition may include conventional pigments, dyes, antioxidants, etc., which are not primary contributors to the films or coatings prepared from the composition. The composition also may contain minor amounts of acrylic and/or epoxy compounds to aid in the flow-out of the coating composition during curing, thereby enhancing the appearance of the resulting coatings. In addition to cellulose acetate butyrate, the film-forming constitutents of the novel powder coating composition must include a plasticizer to impart toughness, i.e., impact strength and flexibility, to the film or coating. Since the composition is thermosetting, a crosslinking agent and a crosslinking catalyst also are essential film-forming constituents The composition may be formuated using 100 parts by weight of cellulose acetate butyrate, from about 2 to about 10 phr (parts per hundred parts cellulose acetate butyrate resin) crosslinking agent, from about 10 to about 25 phr plasticizer, from about 0.5 to about 3.0 phr catalyst, and conventional amounts, if desired, of pigment and stabilizer. Preferably, the composition contains about 5.0 phr crosslinking agent, about 17–18 phr plasticizer, about 1.0 part catalyst, about 50 phr pigment and about 0.5 phr stabilizer.

The crosslinking agents of this invention are well known in the art and many are commercially available. Suitable crosslinking agents include melamine-formaldehyde condensates such as butylated melamine-formaldehyde condensates such as those sold under the trade names Plaskon 3382, Resimine 879 and Beckamine 1216-S. Preferred crosslinking agents include hexaalkoxymethylmelamines wherein the alkoxy group contains from 1 to 20 carbon atoms, for example, hexamethoxymethylmelamine. Cymel 300 is suitable for this use and is available from American Cyanamid Company.

To insure that the powder will flow out and form a smooth coating prior to crosslinking, it is desirable to delay the action of the crosslinking agent until a temperature is reached which is appreciably higher than the flow-out temperature. This may be accomplished by use of an acid catalyst such as p-toluenesulfonic acid which can be temporarily deactivated or neutralized by reacting it with a compound containing an oxirane group, i.e.,

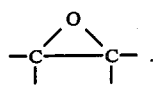

One suitable compound has the formula

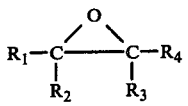

wherein $R_1$ is alkyl, aryl, or aryloxy from $C_1$–$C_{20}$, and $R_2$, $R_3$, and $R_4$ are each hydrogen, alkyl from $C_1$ to $C_8$ or phenyl. Preferably, the compound is bisphenol A bisglycidyl ether or its low polymers commercially available from Shell Chemical Company under the trade name Epon resins, and $R_2$, $R_3$ and $R_4$ are each hydrogen.

The temporary deactivation of the acid catalyst is thought to occur through the oxirane group tying up the acid group which can later be freed or reactivated through the application of heat. To produce the temporarily deactivated catalyst, the acid catalyst and the epoxy compound are mixed in about stoichiometric proportions and allowed to stand for a sufficient period of time to assure that a complete reaction has occurred. Once the reaction has occurred the catalyst is in a "neutral" state.

Another type of epoxy compound that is a good source of the oxirane group for use in forming the temporarily deactivated acidic catalyst is sold under the trade name Epoxol 9-5. Obviously, other materials of oils could be used as long as they will furnish an oxirane group for reacting with the acidic catalyst to form the desired reversible, normally neutral catalyst product. also, substituted oxirane compounds such as ethylene oxide or propylene oxide may be used. A commercially available resin is Epon 812 marketed by Shell Chemical Company.

Although p-toluenesulfonic acid is preferred as the base acid from which the blocked catalyst is to be formed, it should be realized that other aromatic acids which will react properly with an oxirane group and can later be restored to an acidic or active condition by heating for promotion of a reaction between the crosslinking agent and polyester could be used. Examples of other acids which can be used are: phenyl acid phosphate, butyl acid phosphate, oxalic acid, benzenesulfonic, and monobutyl acid maleate.

It is desirable to conduct the blocking of the catalyst in a mixture containing an inert ingredient such as a solvent in order to limit the rate of the blocking reaction. If the reaction is too vigorous, a great deal of heat is evolved, and, in the absence of solvent, the temperature may reach a point when the oxirane component will either evaporate from the reaction vessel or will polymerize into a gel.

The blocked catalyst does not appear to unblock at temperatures below about 290° F. with any appreciable rate. Oxirane compounds appear to react with p-toluenesulfonic acid to cause the acid to become inactive until such a time as it is heated above about 290° F.

It is believed that an acid, HB, reacts with a compound containing an oxirane structure to form a beta hydroxy ester of the acid. That is, the following reaction occurs which results in the formation of the blocked catalyst:

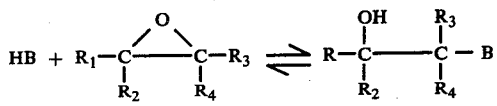

$R_1$, $R_2$, $R_3$, and $R_4$ are as defined hereinbefore. B represents the anion of the acid used for catalysis.

In the specific case of p-toluenesulvonic acid and propylene oxide the reaction is believed to be:

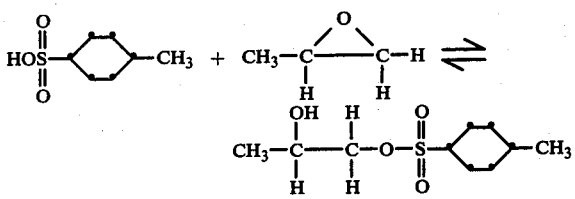

When heated above about 290° F., this reaction is apparently reversed, allowing the free acid to be formed which thus is available to catalyze the crosslinking of the film. It is apparently only at temperatures above about 290° F. that this reverse action occurs rapidly enough to cause the crosslinking reaction to take place rapidly.

The catalyst is prepared from one part of a 1:1 solution of p-toluenesulfonic acid and n-butanol and 4 parts Epon 812, a glycerol epichlorohydrin type epoxy resin sold by Shell Chemical Company or a bisphenol A epichlorohydrin type epoxy resin.

The thermosetting powder coating composition also contains a suitable plasticizer. The plasticizer must be sufficiently compatible to avoid a sticky formulation. Suitable plasticizers include dioctyl phthalate, dibutyl phthalate, butyl benzyl phthalate, 2,2,4-trimethylpentanediol-1,3-monoisobutyrate monobenzoate, trioctyl trimellitate, an ester derived from neopentyl glycol and adipic acid, or the like.

Conventional stabilizers, such as Irganox 1093, a product of Ciba-Geigy, may be used in small amounts to prevent discoloration, etc.

Also, conventional dyes or pigments such as R-100 titanium dioxide pigment marketed by Du Pont may be used.

The components of the powder coating compositions according to this invention may be mixed by dry blending in a mixer or blender (e.g., a Waring Blender), followed by compounding in a Brabender Extruder (¾ inch) at 115°–130° C. and 50–100 rpm, granulating, cryogenically grinding and then screening to obtain a 150 mesh powder for coating. The powder coating composition has a particle size of about 10 to 300 microns and preferably less than about 105 microns, a particle size obtained by sieving through a 150 mesh sieve. Also, the plasticizer and cellulose ester, pigment and stabilizer, if used, may be extruded at about 200° C., then mixed with the crosslinking agent, catalyst, and plasticizer (if used) in a Banbury mixer, a combination of a Banbury mixer and roll mill, a roll mill alone or an extruder at a temperature of between about 100° C. and 150° C. alternately, all the components may be dissolved in a solvent such as methylene chloride (at about 20 weight percent solids) and spray dried at a chamber temperature of about 50° C. by well-known techniques.

The powder composition may be deposited on the substrate by use of a powder gun, by electrostatic deposition or by deposition from a fluidized bed or by other well-known methods of powder deposition. After deposition the powder is heated to a temperature sufficient to cause its particles to flow and thus fuse together to form a smooth, uniform, continuous, uncratered coating on the substrate surface. Normally, temperatures of around 350° F.–425° F. are required for curing.

The examples which follow are submitted for a better understanding of the invention.

In the examples, the physical properties of the coatings are determined as follows:

Appearance Rating: In order to obtain appearance as a numerical value for identification, the following rating system for "orange peel" appearance and crater evaluation is used:

| | |
|---|---|
| 8 - None | 3 - Moderate |
| 7 - Trace | 2 - Moderate to heavy |
| 6 - Very slight | 1 - Heavy |
| 5 - Slight | 0 - Very heavy |
| 4 - Slight to moderate | |

Adhesion Tape Test: Seven horizontal score lines about 1/16 inch apart are crossed with seven vertical score lines about 1/16 inch apart using a sharp razor blade to cut through the coating to the metal. Pressure sensitive tape (Scotch) is pressed down firmly over the cross-hatched pattern and pulled off rapidly. A complete failure is recorded when the coating is completely peeled off. A partial failure is noted when 5 squares or more are lifted and a slight failure is identified when less than five squares are lifted. When the coating is brittle, as may occur from degradation, it does not have the cohesive strength to peel, and hence splits next to the score line giving an apparent appearance of good adhesion since the bulk of the coating is not removed. It is necessary to examine the tape and the coating for signs of such behavior being due to brittleness and not adhesion.

Acetone Resistance: The softening of the coating caused by acetone being applied to the surface is determined.

Impact Strength: Impact strength is determined by using a Gardner Laboratory, Inc., Impact Tester. A weight is dropped within a slide tube from a specified height to hit a punch having a ⅝ inch diameter hemispherical nose which is driven into the front (coated face) or back of the panel. The highest impact which does not crack the coating is recorded in inch-pounds, front and reverse.

Flexibility: The test panel is bent over a period of 15 seconds, using a Gardner Laboratory, Inc., conical mandrel of specified size, according to ASTM D-522. A pass or fail is recorded.

Gloss: Twenty degree and sixty degree gloss are measured using a gloss meter (Gardner Laboratory, Inc., Model GC-9095) according to ASTM D-523.

Pencil Hardness: The pencil hardness of a coating is that of the hardest pencil that will not cut into the coating. The procedure for preparing the truncated cone pencil lead and carrying out the test is given in the National Coil Coaters Association Technical Bulletin No. II (August 12, 1968). Results are expressed according to the following scale:

(softest) 6B, 5B, 4B, 3B, 2B, B, HB, F, H, 2H, 3H, 4H, 5H, 6H (hardest).

Fusion of the Coating: Coated test panels are placed in a Freas Model 625A forced air oven and fused at a specified temperature for a specified time. The fused coatings are then hung on a bar to cool at room temperature.

In the examples, powder coatings having the following compositions are formulated and tested:

| Component | Parts by Weight |
|---|---|
| Cellulose acetate butyrate (as described) | 100 |
| Pigment - titanium dioxide, R-100, a product of Du Pont | 50 |
| Plasticizer - trioctyl trimellitate, Kodaflex | 17.5 |
| Crosslinking agent (Cymel 300 hexamethoxymethylmelamine) | 5.0 |
| Catalyst - p-toluenesulfonic acid, epoxy resin and butanol | 1.0 |
| Stabilizer - Good-Rite 3114 | 0.5 |

In the Examples 1 through 11 of Table I, cellulose acetate butyrate is used which has an ASTM (A) viscosity of 0.17, an acetyl content of 1.5%, a butyryl content of 51.5% and a hydroxyl content of 1.85. Example 1 illustrates the effect of a relatively low curing temperature resulting in less than desirable impact strength and acetone resistance. However, Examples 2 through 10 resulted in very desirable coatings. Example 11, however, with a coating thickness of 6.9 mils, resulted in less than desirable impact strength.

TABLE I

| Ex. | Fusion Temp., ° F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 1 | 350 | 1.2 | 41 | 73 | 5 | 8 | 140 | 20 | B | [P] | P | P | Poor |
| 2 | 375 | 1.3 | 28 | 59 | 6 | 8 | >160 | 150 | B | [P] | P | P | Fair |
| 3 | 400 | 1.2 | 25 | 54 | 6 | 8 | >160 | >160 | B | [P] | P | P | Good |
| 4 | 425 | 1.3 | 23 | 54 | 6 | 8 | >160 | 140 | B | [P] | P | P | Excellent |
| 5 | 450 | 1.3 | 22 | 54 | 6 | 8 | >160 | 150 | B | [P] | P | P | Excellent |
| 6 | 400 | 0.7 | 5 | 21 | — | — | >160 | >160 | B | P | P | P | |
| 7 | 400 | 1.0 | 15 | 48 | 6 | 8 | >160 | >160 | B | [P] | P | P | |
| 8 | 400 | 1.8 | 27 | 55 | 6 | 8 | >160 | >160 | B | [P] | P | P | |
| 9 | 400 | 2.5 | 27 | 54 | 6 | 8 | >160 | 150 | B | [P] | P | P | |
| 10 | 400 | 3.3 | 26 | 51 | 7 | 8 | 140 | 120 | B | [P] | P | P | |
| 11 | 400 | 6.9 | 14 | 44 | 7 | 8 | 90 | 20 | B | [P] | P | P | |

In the Examples 12 through 22, cellulose acetate butyrate is used which has a ASTM (A) viscosity of 1.3, an acetyl content of 3.0, a butyryl content of 49.3 and a hydroxyl content of 1.87. It will be seen that the appearance of the coatings made from this composition is less than desirable primarily because of the appearance rating and gloss. The less than desirable flow characteristics are because the viscosity of the cellulose acetate butyrate exceeds the upper limit of 1.0.

results in excellent properties except that the flow characteristics are somewhat less than desirable. The viscos-

TABLE II

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 12 | 350 | 1.5 | 9 | 37 | 2 | 5 | >160 | >160 | 2B | [P] | P | P | Poor |
| 13 | 375 | 1.5 | 16 | 51 | 3 | 6 | >160 | >160 | 2B | P | P | P | Fair |
| 14 | 400 | 1.5 | 14 | 48 | 4 | 6 | >160 | >160 | 2B | P | P | P | Good |
| 15 | 425 | 1.4 | 12 | 45 | 4 | 7 | >160 | >160 | 2B | [P] | P | P | Excellent |
| 16 | 450 | 1.3 | 12 | 45 | 4 | 7 | >160 | >160 | 2B | [P] | P | P | Excellent |
| 17 | 400 | 0.9 | 2 | 5 | — | — | >160 | >160 | 2B | P | P | P | |
| 18 | 400 | 1.5 | 6 | 28 | 2 | 4 | >160 | >160 | 2B | [P] | P | P | |
| 19 | 400 | 2.0 | 9 | 34 | 3 | 5 | >160 | >160 | 2B | [P] | P | P | |
| 20 | 400 | 2.9 | 15 | 47 | 5 | 6 | >160 | >160 | 2B | [P] | P | P | |
| 21 | 400 | 3.3 | 21 | 55 | 5 | 7 | >160 | >160 | 2B | [P] | P | P | |
| 22 | 400 | 6.5 | 10 | 50 | 6 | 8 | >160 | 150 | 2B | P | P | P | |

Examples 23 through 33 in Table III use cellulose acetate butyrate having an ASTM (A) viscosity of 0.35 second, an acetyl content of 1.6%, a butyryl content of 46.9% and a hydroxyl content of 4.45%. It will be seen that such a powder coating composition produces a coating having less than desirable Gardner gloss and appearance rating because the powder coating has less than desirable flow characteristics. Furthermore, the coating has poor impact strength and flexibility. The hydroxyl content of the cellulose acetate butyrate exceeds the upper limit of 3, giving poor flow and higher than desirable crosslink density.

ity is close to the upper limit of 1.0 second, but this is counteracted by the hydroxyl content being at the lower end of the range.

TABLE IV

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 34 | 350 | 1.3 | 8 | 32 | 3 | 8 | 80 | 10 | B | [P] | P | P | Poor |
| 35 | 375 | 1.0 | 14 | 47 | 5 | 8 | 150 | 110 | B | [P] | P | P | Fair |
| 36 | 400 | 0.9 | 14 | 47 | 6 | 8 | >160 | >160 | B | [P] | P | P | Good |
| 37 | 425 | 0.9 | 9 | 38 | 6 | 8 | >160 | >160 | B | [P] | P | P | Good |
| 38 | 450 | 1.0 | 10 | 40 | 6 | 8 | 120 | 10 | B | [P] | P | P | Good |
| 39 | 400 | 0.7 | 4 | 23 | — | — | >160 | >160 | B | P | P | P | |
| 40 | 400 | 1.5 | 13 | 45 | 3 | 8 | >160 | >160 | B | [P] | P | P | |
| 41 | 400 | 1.9 | 16 | 48 | 5 | 8 | >160 | >160 | B | [P] | P | P | |
| 42 | 400 | 2.5 | 20 | 53 | 6 | 8 | >160 | 130 | B | [P] | P | P | |
| 43 | 400 | 2.9 | 20 | 53 | 6 | 8 | >160 | 100 | B | [P] | P | P | |
| 44 | 400 | 6.1 | 20 | 54 | 6 | 8 | 90 | 60 | B | P | P | P | |

In Examples 45 through 55 contained in Table V which follows, cellulose acetate butyrate having an ASTM (A) viscosity of 2.0 seconds, an acetyl content of 5.7, a butyryl content of 50.1 and a hydroxyl content of 0.1 is used. This composition has good flow characteristics and has poor solvent resistance although physical properties such as impact strength, hardness and adhesion are acceptable. The viscosity exceeds the limit of 1.0 second and the hydroxyl content is below the lower

TABLE III

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 23 | 350 | 3.1 | 1 | 2 | — | 3 | 120 | 10 | B | [P] | P | F | Good |
| 24 | 375 | 3.2 | 1 | 2 | — | 3 | 100 | 10 | B | [P] | P | F | Good |
| 25 | 400 | 2.9 | 1 | 2 | — | 3 | 110 | <10 | B | [P] | P | F | Good |
| 26 | 425 | 2.6 | 1 | 3 | — | 3 | 100 | <10 | B | [P] | P | F | Good |
| 27 | 450 | 2.6 | 1 | 3 | — | 3 | 100 | <10 | B | [P] | P | F | Good |
| 28 | 400 | 2.7 | 1 | 2 | — | — | >160 | >160 | B | [P] | P | P | |
| 29 | 400 | 3.6 | 1 | 2 | — | 2 | 130 | 30 | B | [P] | P | F | |
| 30 | 400 | 3.9 | 1 | 2 | — | 2 | 110 | 10 | B | [P] | P | F | |
| 31 | 400 | 4.5 | 1 | 2 | — | 3 | 100 | 10 | B | [P] | P | F | |
| 32 | 400 | 5.5 | 2 | 2 | — | 3 | 80 | <10 | B | [P] | P | F | |
| 33 | 400 | 7.7 | 2 | 2 | — | 3 | 60 | <10 | B | [P] | P | F | |

Examples 34 through 44 contained in Table IV which follows utilize a cellulose acetate butyrate coating having an ASTM (A) viscosity of 0.9 second, an acetyl content of 5.6, a butyryl content of 48.6 and a hydroxyl content of 0.73. It will be noted that this composition limit of 0.5%. The low hydroxyl content has not enabled sufficient crosslinking to achieve solvent resistance. This poor crosslinking enables a material with a viscosity exceeding the limit of 1.0 second to give good flow as the viscosity build up or curing is retarded.

TABLE V

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 45 | 350 | 2.9 | 1 | 2 | — | 3 | 80 | 10 | B | [P] | P | P | Poor |
| 46 | 375 | 1.5 | 10 | 37 | 4 | 8 | 80 | 10 | B | P | P | P | Poor |
| 47 | 400 | 1.3 | 28 | 66 | 6 | 8 | >160 | >160 | B | [P] | P | P | Poor |
| 48 | 425 | 1.1 | 22 | 60 | 6 | 8 | 150 | 150 | B | [P] | P | P | Poor |
| 49 | 450 | 1.0 | 18 | 55 | 6 | 8 | >160 | >160 | B | [P] | P | P | Poor |
| 50 | 400 | 0.9 | 4 | 19 | — | — | >160 | >160 | B | P | P | P | |
| 51 | 400 | 1.6 | 14 | 46 | 4 | 8 | >160 | >160 | B | [P] | P | P | |
| 52 | 400 | 2.2 | 21 | 57 | 6 | 8 | >160 | >160 | B | [P] | P | P | |
| 53 | 400 | 2.6 | 27 | 64 | 6 | 8 | >160 | >160 | B | [P] | P | P | |
| 54 | 400 | 3.2 | 29 | 67 | 6-7 | 8 | >160 | >160 | B | [P] | P | P | |
| 55 | 400 | 5.6 | 34 | 70 | 7 | 8 | 140 | 120 | B | P | P | P | |

In Examples 56 through 66 contained in Table VI which follows, cellulose acetate butyrate having an ASTM (A) viscosity of 0.12 second, an acetyl content of 12.8, a butyryl content of 37.6 and a hydroxyl content of 2.01 is used. This composition provides a good coating having excellent physical properties and appearance.

TABLE VI

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 56 | 350 | 1.5 | 18 | 54 | 4 | 7 | 80 | 50 | B | [P] | P | P | Fair |
| 57 | 375 | 1.6 | 19 | 56 | 4 | 7 | 100 | 70 | B | [P] | P | P | Good |
| 58 | 400 | 1.2 | 24 | 62 | 5 | 8 | >160 | 130 | B | [P] | P | P | Excellent |
| 59 | 425 | 1.4 | 18 | 56 | 5 | 8 | 150 | 150 | B | [P] | P | P | Excellent |
| 60 | 450 | 1.3 | 15 | 49 | 5 | 8 | 80 | 30 | B | [P] | P | P | Excellent |
| 61 | 400 | 1.3 | 7 | 30 | 2 | 4 | >160 | >160 | B | [P] | P | P | |
| 62 | 400 | 2.0 | 14 | 48 | 3 | 6 | >160 | 150 | B | [P] | P | P | |
| 63 | 400 | 2.5 | 26 | 64 | 4 | 8 | 150 | 140 | B | [P] | P | P | |
| 64 | 400 | 3.1 | 28 | 67 | 5 | 8 | 150 | 110 | B | [P] | P | P | |
| 65 | 400 | 3.8 | 32 | 69 | 6 | 8 | 150 | 90 | B | [P] | P | P | |
| 66 | 400 | 6.5 | 20 | 58 | 6 | 8 | 100 | 20 | B | P | P | P | |

In Examples 67 through 77 which follow in Table VII cellulose acetate butyrate having an ASTM (A) viscosity of 0.41 second, an acetyl content of 12.4, a butyryl content of 38.6 and a hydroxyl content of 1.67 is used. This coating composition results in a coating having excellent physical properties except the orange peel appearance rating is good.

TABLE VII

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 67 | 350 | 1.4 | 17 | 51 | 4 | 6 | 90 | 90 | B | [P] | P | P | Poor |
| 68 | 375 | 1.5 | 14 | 49 | 4 | 6 | >160 | >160 | B | [P] | P | P | Good |
| 69 | 400 | 1.3 | 25 | 65 | 5 | 8 | >160 | >160 | B | [P] | P | P | Excellent |
| 70 | 425 | 1.4 | 19 | 57 | 5 | 8 | >160 | 150 | B | [P] | P | P | Excellent |
| 71 | 450 | 1.3 | 23 | 64 | 5 | 8 | 140 | 100 | B | [P] | P | P | Excellent |
| 72 | 400 | 1.2 | 4 | 19 | 2 | 2 | >160 | >160 | B | [P] | P | P | |
| 73 | 400 | 1.6 | 18 | 57 | 4 | 8 | >160 | 150 | B | [P] | P | P | |
| 74 | 400 | 2.2 | 22 | 60 | 5 | 8 | >160 | 150 | B | [P] | P | P | |
| 75 | 400 | 3.0 | 31 | 69 | 5 | 8 | >160 | 150 | B | [P] | P | P | |
| 76 | 400 | 3.7 | 36 | 75 | 6 | 8 | >160 | 100 | B | [P] | P | P | |
| 77 | 400 | 5.7 | 29 | 70 | 6 | 8 | 110 | 40 | B | P | P | P | |

In Examples 78 through 88 which follow in Table VIII, cellulose acetate butyrate having an ASTM (A) viscosity of 1.1 second, an acetyl content of 13.4, a butyryl content of 37.4 and a hydroxyl content of 1.43 is used. The physical properties of impact strength, hardness, adhesion, flexibility and acetone resistance are excellent, but the appearance rating and flow characteristics are too low for the contemplated applications. The viscosity exceeds the upper limit of 1.0 second.

TABLE VIII

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 78 | 350 | 1.8 | 3 | 16 | 2 | 3 | 110 | 50 | B | [P] | P | P | Poor |
| 79 | 375 | 1.6 | 3 | 17 | 3 | 4 | >160 | 150 | B | [P] | P | P | Good |
| 80 | 400 | 1.5 | 5 | 36 | 3 | 4 | >160 | 150 | B | [P] | P | P | Excellent |
| 81 | 425 | 1.4 | 5 | 25 | 4 | 5 | >160 | 130 | B | [P] | P | P | Excellent |
| 82 | 450 | 1.4 | 4 | 22 | 4 | 5 | 130 | 80 | B | [P] | P | P | Excellent |
| 83 | 400 | 1.4 | 1 | 4 | — | — | >160 | >160 | B | P | P | P | |
| 84 | 400 | 1.8 | 2 | 7 | 1 | 2 | >160 | >160 | B | [P] | P | P | |
| 85 | 400 | 2.4 | 3 | 16 | 3 | 4 | >160 | >160 | B | [P] | P | P | |
| 86 | 400 | 3.1 | 5 | 26 | 5 | 7 | >160 | >160 | B | [P] | P | P | |
| 87 | 400 | 3.9 | 9 | 39 | 5 | 7 | >160 | >160 | B | P | P | P | |

TABLE VIII-continued

| Ex. | Fusion Temp., °F. Minutes | Thickness, Mils | Gardner Gloss 20° | Gardner Gloss 60° | Appearance Rating Orange Peel | Appearance Rating Crater | Impact Strength In.-Lb. Front | Impact Strength In.-Lb. Reverse | Pencil Hardness | Adhesion Scotch Tape | Adhesion Peel | Flexibility, ⅛" Mandrel | Acetone Resistance |
|---|---|---|---|---|---|---|---|---|---|---|---|---|---|
| 88 | 400 | 6.1 | 11 | 43 | 5 | 8 | 130 | 90 | B | P | P | P | |

EXAMPLE 89

Cellulose acetate butyrate having a viscosity of 0.08-0.2, an acetyl content of 2.0%, a butyryl content of 53%, and a hydroxyl content of 1.6% was intimately blended by roll milling with the components set forth above, except that no pigment was used. The blend was cryogenically ground to less than 150 mesh and coatings thereof 1.5 mil thick were prepared as described hereinabove. The coatings were cured by heating in an oven at 400° F. for 10 minutes. The coatings exhibited good gloss, appearance and adhesion. The impact strength, flexibility and acetone resistance of the coatings were measured at various points of time: shortly after curing, one day thereafter, and seven days thereafter. The impact strengths (front/reverse) were <160/140, 150/120 and 140/120, respectively, while passes were recorded for each flexibility test and each test indicated excellent acetone resistance.

Unless otherwise specified, all parts, percentages, ratios, etc., are on a weight basis. Where percentages by weight of acetyl, butyryl and hydroxyl contents are given, they are measured as a percentage of the total weight of one anhydroglucose unit. Viscosity in seconds is measured according to ASTM procedure D-817-65, Formula A, and D-1343-

The term "cellulose acetate butyrate" is used herein in reference to the cellulose ester because cellulose butyrate normally contains some acetyl groups. However, it should be realized that there may be situations where the cellulose ester contains essentially no acetyl groups.

Although the invention has been described in considerable detail with particular reference to certain preferred embodiments thereof, variations and modifications can be effected within the spirit and scope of the invention.

We Claim:

1. A thermosetting coating composition in the form of a powder having an average particle size of between about 10 and about 300 microns comprising:
   (a) cellulose acetate butyrate having an acetyl content of from 0 to about 15% by weight, a butyryl content of from about 35 to about 55% by weight, a hydroxyl content of from about 0.5 to about 3.0% by weight and a viscosity of from about 0.05 to about 1.0 second,
   (b) from about 10 to about 25 phr by weight of a placticizer for said cellulose acetate butyrate,
   (c) from about 2 to about 10 phr by weight of a hexaalkoxymethylmelamine crosslinking agent wherein the alkoxy group contains from 1 to 20 carbon atoms, and
   (d) from about 0.1 phr to about 3.0 phr by weight of the reaction product of an aromatic sulfonic acid and a compound containing at least one oxirane group.

2. A thermosetting coating composition according to claim 1 wherein said cellulose acetate butyrate has a viscosity of from about 0.1 to about 0.3 second.

3. A thermosetting coating composition according to claim 1 wherein the hydroxyl content of said cellulose acetate butyrate is between about 1.5 and about 2.5% by weight.

4. A thermosetting coating composition according to claim 1 wherein the crosslinking agent is hexamethoxymethylmelamine.

5. A thermosetting coating composition in the form of a powder having an average particle size of between about 10 and about 300 microns, the film-forming constituents of which consist essentially of:
   (a) cellulose acetate butyrate having an acetyl content of from 0 to about 15% by weight, a butyryl content of from about 35 to about 55% by weight, a hydroxyl content of from about 0.5 to about 3.0% by weight, and a viscosity of from about 0.05 to about 1.0 second,
   (b) from about 15 to about 20 phr by weight of a plasticizer for said cellulose acetate butyrate,
   (c) from about 3 to about 7 phr by weight of a hexaalkoxymethylmelamine crosslinking agent wherein the alkoxy group contains from 1 to 20 carbon atoms, and
   (d) from about 0.5 phr to about 2 phr by weight of the reaction product of an aromatic sulfonic acid and a compound containing at least one oxirane group.

6. A thermosetting coating composition according to claim 5 wherein the crosslinking agent is hexamethoxymethylmelamine.

7. A thermosetting coating composition in the form of a powder having an average particle size of between about 10 and about 300 microns which consists essentially of:
   (a) cellulose acetate butyrate having an acetyl content of from 0 to about 15% by weight, a butyryl content of from about 35 to about 55% by weight, a hydroxyl content of from about 0.5 to about 3.0% by weight, and a viscosity of from about 0.05 to about 1.0 second,
   (b) from about 10 to about 25 phr by weight of a plasticizer for said cellulose acetate butyrate,
   (c) from about 2 to about 10 phr by weight of a hexaalkoxymethylmelamine crosslinking agent wherein the alkoxy group contains from 1 to 20 carbon atoms,
   (d) from about 0.1 phr to about 3.0 phr by weight of the reaction product of an aromatic sulfonic acid and a compound containing at least one oxirane group, and
   (e) from about 25 phr to about 75 phr of a color pigment,
said coating composition being free from appreciable crosslinking.

8. A substrate having adhered on a surface thereof the coating composition according to claim 1.

* * * * *